(12) United States Patent
Nakashima

(10) Patent No.: US 8,970,189 B2
(45) Date of Patent: Mar. 3, 2015

(54) VOLTAGE GENERATION CIRCUIT

(75) Inventor: Shingo Nakashima, Kanagawa (JP)

(73) Assignee: Renesas Electronics Corporation, Kawasaki-shi (JP)

(*) Notice: Subject to any disclaimer, the term of this patent is extended or adjusted under 35 U.S.C. 154(b) by 245 days.

(21) Appl. No.: 13/570,293

(22) Filed: Aug. 9, 2012

(65) Prior Publication Data
US 2013/0038314 A1 Feb. 14, 2013

(30) Foreign Application Priority Data

Aug. 11, 2011 (JP) ................................ 2011-175775

(51) Int. Cl.
*G05F 1/00* (2006.01)
*G05F 1/575* (2006.01)
(52) U.S. Cl.
CPC ....................................... *G05F 1/575* (2013.01)
USPC ............................ 323/280; 323/271; 323/282
(58) Field of Classification Search
USPC .......................... 323/268, 271–273, 280, 282
See application file for complete search history.

(56) References Cited

U.S. PATENT DOCUMENTS

| 6,340,852 B1 | 1/2002 | Mizoguchi |
| 7,531,996 B2 * | 5/2009 | Yang et al. ..................... 323/282 |
| 7,538,529 B2 * | 5/2009 | Nishida .......................... 323/282 |
| 7,570,107 B2 * | 8/2009 | Kim et al. ...................... 327/539 |

FOREIGN PATENT DOCUMENTS

JP   2000-339042 A   12/2000

* cited by examiner

*Primary Examiner* — Emily P Pham
(74) *Attorney, Agent, or Firm* — Miles & Stockbridge P.C.

(57) ABSTRACT

A voltage generation circuit supplies an internal power supply voltage to an internal circuit via an output terminal and includes a regulator, a second drive element, and a control circuit. The regulator includes a first drive element disposed between an external power supply VDD (first power supply) and an output terminal, and supplies a voltage based on a reference voltage to the output voltage by controlling the first drive element. The second drive element is disposed between the external power supply VDD and the output terminal, and supplies a voltage of the external power supply VDD to the output terminal when activated. When a voltage of the external power supply is a previously set detection voltage value or less, the control circuit activates the first and the second drive element, and when the voltage of the external power supply exceeds the detection voltage value, deactivates the second drive element.

19 Claims, 8 Drawing Sheets

VOLTAGE GENERATION CIRCUIT

CROSS-REFERENCE TO RELATED APPLICATIONS

This application is based upon and claims the benefit of priority from Japanese patent application No. 2011-175775, filed on Aug. 11, 2011, the disclosure of which is incorporated herein in its entirety by reference.

BACKGROUND

The present invention relates to a power supply circuit of a semiconductor integrated circuit, and particularly to a regulator circuit.

In related arts, a step-down regulator has been used in an attempt to reduce current consumption in a semiconductor internal circuit and not apply a voltage greater than or equal to the rated value of an internal power supply voltage to the internal circuit. However, there has been a problem that when the voltage supplied to the regulator is reduced, the output voltage from the regulator is reduced, the operation of the internal circuit is not stabilized. Therefore, a following configuration has generated a technique to stably supply the internal power supply voltage while reducing the power consumption. The configuration is that when an external power supply voltage exceeds the rated value of the internal power supply voltage, a voltage reduced by a regulator circuit is supplied as the internal power supply voltage, while when the external power supply voltage is less than or equal to the rated value of the internal power supply voltage, the regulator circuit is deactivated and the internal power supply voltage is directly supplied by an external power supply line. A related art is disclosed in Japanese Unexamined Patent Application Publication No. 2000-339042.

Japanese Unexamined Patent Application Publication No. 2000-339042 aims to reduce current consumption in a semiconductor integrated circuit and stably supply the internal power supply voltage, and has a feature of including a regulatory function for supplying a stabled voltage to an internal circuit from an external power supply that is supplied to the semiconductor integrated circuit. Specifically, when the external power supply voltage exceeds the rated value of the internal power supply voltage, the voltage reduced by the regulator circuit is supplied as the internal power supply voltage. When the external power supply voltage is less than or equal to the rated value of the internal power supply voltage, the regulator circuit is deactivated and the internal power supply voltage is directly supplied by the external power supply line.

FIG. 8 shows a configuration of a voltage generation circuit disclosed in Japanese Unexamined Patent Application Publication No. 2000-339042. A voltage generation circuit $100p$ includes an external power supply line $10p$ to which an external power supply voltage VCE is transmitted, an internal power supply line $20p$ for supplying an internal power supply voltage Vcc to a load, a regulator circuit $30p$ that has the external power supply line $10p$ as an internal terminal and outputs 3.3 V, which is the rated value of the internal power supply voltage Vcc, from an output terminal, and a voltage switching transistor $50p$ that is activated according to a voltage level of a node Na and connects the external power supply line $10p$ and the internal power supply line $20p$.

The regulator circuit $30p$ further includes an output control terminal CNT. When an H-level signal is input to the output control terminal CNT, the regulator circuit $30p$ is deactivated and stops generating the output voltage (3.3 V) to the output terminal OUT. Accordingly, one of the regulator circuit $30p$ and the voltage switching transistor $50p$ is complementarily activated according to the voltage level of the node Na.

The voltage generation circuit $100p$ further includes a comparator $40p$ for determining the voltage level of Na according to the external power supply voltage VCE. The comparator $40p$ outputs the H level to the node Na when the external power supply voltage VCE is greater than a reference voltage V1. The comparator $40p$ is composed of a differential amplifier circuit and the like using an operational amplifier. The reference voltage V1 may be set to a voltage greater than the rated value of the internal power supply voltage Vcc and also less than a peak value of the external power supply voltage. In FIG. 6, the reference voltage is set to 3.9 V, for example. The voltage generation circuit $100p$ further includes capacitors Ci and Co for stabilizing the voltage of the external power supply line $10p$ and the internal power supply line $20p$.

In the voltage generation circuit $100p$, when the external power supply voltage VCE is 3.3 V ($\leq$V1:V1 or less), the external power supply line $10p$ and the internal power supply line $20p$ are connected by turning on the voltage switching transistor $50p$ while deactivating the regulator circuit $30p$ and stopping from generating an output voltage by lowering the voltage of the node Na to the L level by the comparator $40p$. Then, when the external power supply voltage VCE is 3.3 V, the internal power supply voltage is directly supplied to the internal power supply line $20p$ by the external power supply line $10p$.

On the other hand, when the external power supply voltage VCE is 5 V ($\geq$V1:V1 or greater), the H-level voltage is output to the node Na by the comparator $40p$. This activates the operation of the regulator circuit $30p$ while turning off the voltage switching transistor $50p$. Accordingly, when the external power supply voltage VCE is 5 V, the internal power supply line $20p$ and the external power supply line $10p$ are blocked and the output voltage from the regulator circuit $30p$ is supplied to the internal power supply line $20p$.

As described above, the following configuration enables the voltage generation circuit $100p$ to stably supply the internal power supply voltage while reducing the entire power consumption. The configuration is that when the external power supply voltage exceeds the rated value of the internal power supply voltage, the voltage reduced by the regulator circuit is supplied as the internal power supply voltage. When the external power supply voltage is the rated value of the internal power supply voltage, the regulator circuit is deactivated and the internal power supply voltage is directly supplied from the external power supply line.

However, there lies a problem in the technique disclosed in Japanese Unexamined Patent Application Publication No. 2000-339042 that the output voltage from the regulator could easily fluctuate when switching between the step-down regulator and the means to directly supply the internal power supply voltage from the external power supply line. In other words, there is a problem that a fluctuation is generated in the output voltage from the regulator by the fluctuation in the external power supply voltage. The reason is that as the regulator circuit $30p$ and the voltage switching transistor $50p$ are complementarily activated according to the voltage level of the node Na, when the external power supply voltage VCE is less than the reference voltage V1, for example, a time lag is generated since the voltage switching transistor $50p$ is turned off until the regulator circuit $30p$ is activated, and thereby fluctuating the internal power supply voltage Vcc.

For this problem, the technique disclosed in Japanese Unexamined Patent Application Publication No. 2000-339042 includes a stabilizing capacity as an output external component of the regulator circuit and this enables suppression of fluctuation in the output voltage. On the other hand, the stabilizing capacity as the output external component has a disadvantage such as an increase in the device cost due to reservation of an area on the mounting substrate and mounting components.

SUMMARY

In recent years, there has been an increasing need for a power supply circuit that does not require the stabilizing capacity as the external component.

The present inventors have found that the fluctuation in the output voltage from the regulator by the fluctuation in the external power supply voltage can be suppressed by controlling a drive element included in the regulator.

An aspect of the present invention is a voltage generation circuit that supplies an internal power supply voltage to an internal circuit via an output terminal that includes a regulator, a second drive element, and a control unit. The regulator includes a first drive element disposed between a first power supply and the output terminal, and supplies a voltage based on a reference voltage to the output terminal by controlling the first drive element. The second drive element is disposed between the first power supply and the output terminal and supplies a voltage of the first power supply to the output terminal when the second drive element is in an active state. The control unit controls the first drive element and the second drive element to be in the active state when the voltage of the first power supply is less than or equal to a previously set detection voltage value and controls the second drive element to be in an inactive state when the voltage of the first power supply exceeds the detection voltage value. The first drive element is controlled to be in the active state while the second drive element is in the active state. Thus, when the voltage of the first power supply exceeds the detection voltage value and the second drive element transitions to the inactive state, current can be supplied to the output terminal via the first drive element without requiring for the time until the first drive element is activated. This suppresses a fluctuation in the voltage supplied to the internal circuit when voltage supply is switched from the second drive element to the regulator.

The present invention enables suppression of fluctuation in the output voltage from the regulator by the fluctuation in the external power supply voltage.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Hereinafter, embodiments of the present invention are explained with reference to the drawings. For the clarity of the explanation, the following explanation and drawings are omitted and simplified as appropriate. The components and equivalent parts including the same configuration or the function in each drawing are denoted by the same numerals and the explanation is omitted.

First Embodiment

Configuration of First Embodiment

Figure 1:
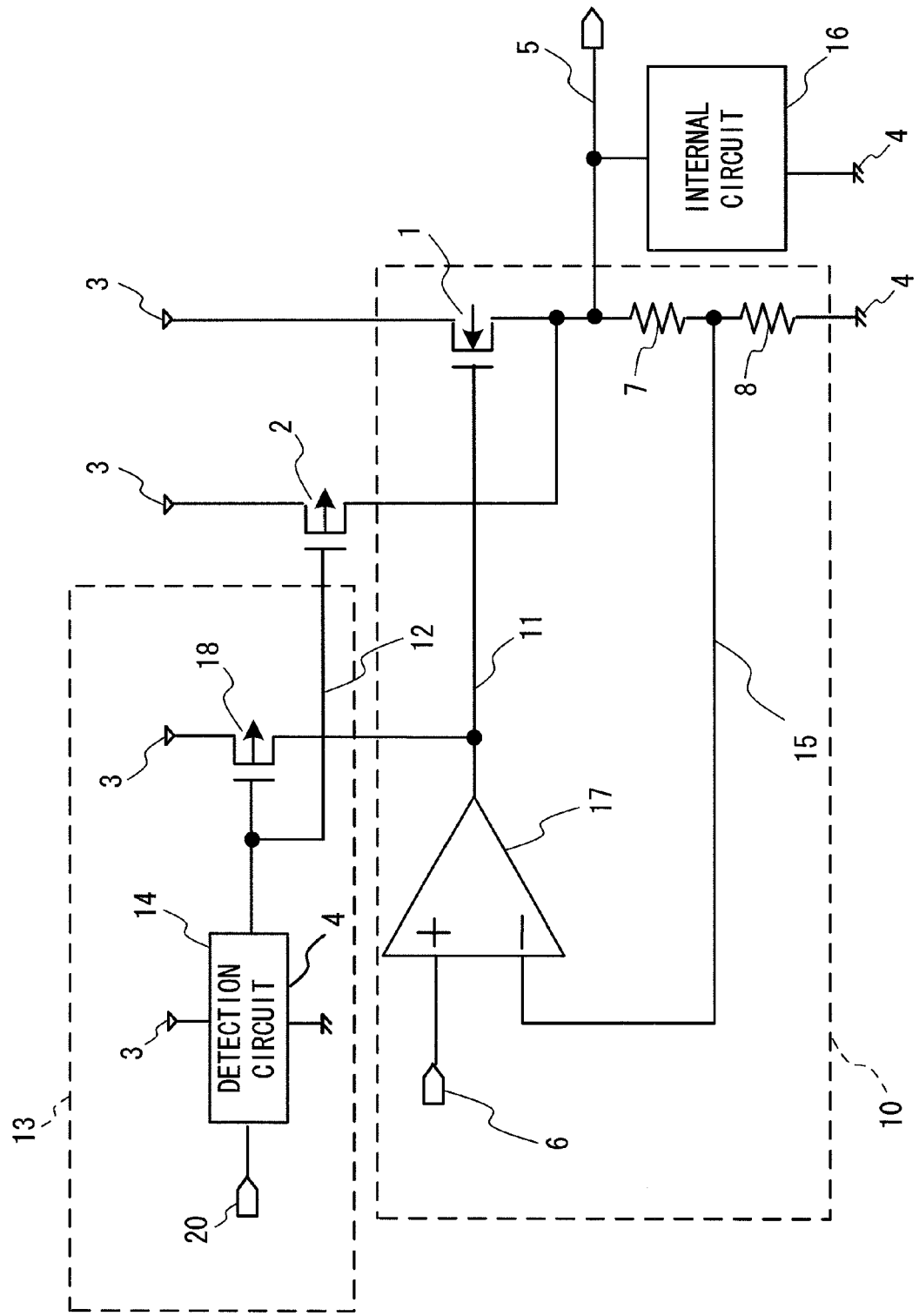
FIG. 1 is a view showing a configuration example of a voltage generation circuit according to a first embodiment of the present invention.

FIG. 1 is a view showing a configuration example of a power generation circuit according to a first embodiment of the present invention. The power generation circuit supplies an internal power supply voltage to an internal circuit 16 via an output voltage line (output terminal) 5, and includes a regulator 10, a drive element (second drive element) 2, and a control circuit (control unit) 13. The internal circuit 16 is driven by the internal power supply voltage supplied from the output voltage line 5.

The regulator 10 includes a drive element (first drive element) 1 disposed between an external power supply VDD (first power supply) 3 and the output voltage line 5, and supplies a voltage based on a reference voltage (first reference voltage) 6 to the output voltage line 5 as the internal power supply voltage by controlling the drive element 1.

The regulator 10 further includes resistive elements 7 and 8 and an amplifier circuit 17 in addition to the above-mentioned drive element 1.

As for the amplifier circuit 17, one input terminal is connected to the reference voltage 6 and the other input terminal is connected to a line 15. The amplifier circuit 17 amplifies a difference voltage between the reference voltage 6 and the voltage of the line 15, and outputs the amplified voltage to the output line 11. The line 15 is connected between the other input terminal of the amplifier circuit 17 and between the resistive elements 7 and 8. The line 15 is supplied with a voltage that is in proportion to the voltage of the output voltage line 5 by the resistive element 7. The voltage of the output line 11 from the amplifier circuit 17 controls the gate of the drive element 1.

The voltage level less than the rated value of the internal power supply voltage in the internal circuit 16 is previously set to the reference voltage 6.

The drive element 2 is disposed between an external power supply VDD3 and the output voltage line 5, and supplies a voltage of the external power supply VDD3 (hereinafter also referred to as an "external power supply voltage" as appropriate) to the output voltage line 5 in an active state. In other words, the drive element 2 functions as a voltage supply circuit that supplies the external power supply voltage to the output voltage line 5 (internal circuit 16) as the internal power supply voltage.

When a voltage level of the external power supply VDD3 is less than or equal to a detection voltage value generated according to a reference voltage (second reference voltage) 20, the control circuit 13 controls the drive elements 1 and 2 to be in the active state. When the voltage level of the external power supply VDD3 exceeds the detection voltage value, the control circuit 13 controls the drive element 2 to be in an inactive state. The control circuit 13 includes a detection circuit (detection unit) 14 and a control element (third drive element) 18.

The detection circuit 14 detects a voltage that is in proportion to the external power supply VDD3. Specifically, the detection circuit 14 detects whether or not the voltage level of the external power supply VDD3 is less than or equal to the detection voltage value, and outputs an L or H level control signal to an output line 12 (terminal for outputting a detection result) as the detection result. The detection circuit 14 connects the output line 12 to the gate of the drive element 2 and the gate of the control element 18, and controls the active state of the drive element 2 and the control element 18 by the control signal from the output line 12. Specifically, the detection circuit 14 outputs the control signal that activates the drive element 2 and the control element 18 while the voltage level of the external power supply VDD3 is less than or equal to the detection voltage value. The detection circuit 14 outputs the control signal that deactivates the drive element 2 and the control element 18 when the voltage level of the external power supply VDD3 exceeds the detection voltage value.

The control element 18 is disposed between the external power supply VDD3 and the gate of the drive element 1, the gate is connected to the output line 12 of the detection circuit 14, and the active state is controlled by the control signal from the detection circuit 14.

The control element 18 is configured to control the voltage that controls the gate of the drive element 1 and the active state of the drive element 1. Specifically, when the voltage level of the external power supply VDD3 is less than or equal to the detection voltage value (when the control element 18 is activated by the control signal from the detection circuit 14), the control element 18 supplies the voltage of the external power supply VDD3 to the gate of the drive element 1 (output line 11). When the voltage level of the external power supply VDD3 exceeds the detection voltage value, the control element 18 stops supplying the voltage to the gate of the drive element 1.

In FIG. 1, the drive element 1 is composed of an N-type transistor, and the drive element 2 and the control element 18 are composed of a P-type transistor.

The abovementioned control circuit 13 controls the drive element 1 to be in the active state while the voltage level of the external power supply VDD3 is less than or equal to the detection voltage value, in other words, while the control element 18 is in the active state, regardless of the voltage output from the amplifier circuit 17. In addition, the control circuit 13 is configured so that the drive element 1 maintains to be in the active state at the timing when the drive element 2 is controlled from the active state to the inactive state (the timing when the control signal of the detection circuit 14 transitions from L level to H level). This point is described later using FIG. 3. Therefore, the drive element 1 is controlled by the voltage output from the amplifier circuit 17 or the voltage output from the control element 18, in other words, the voltage of the output line 11.

Figure 2:
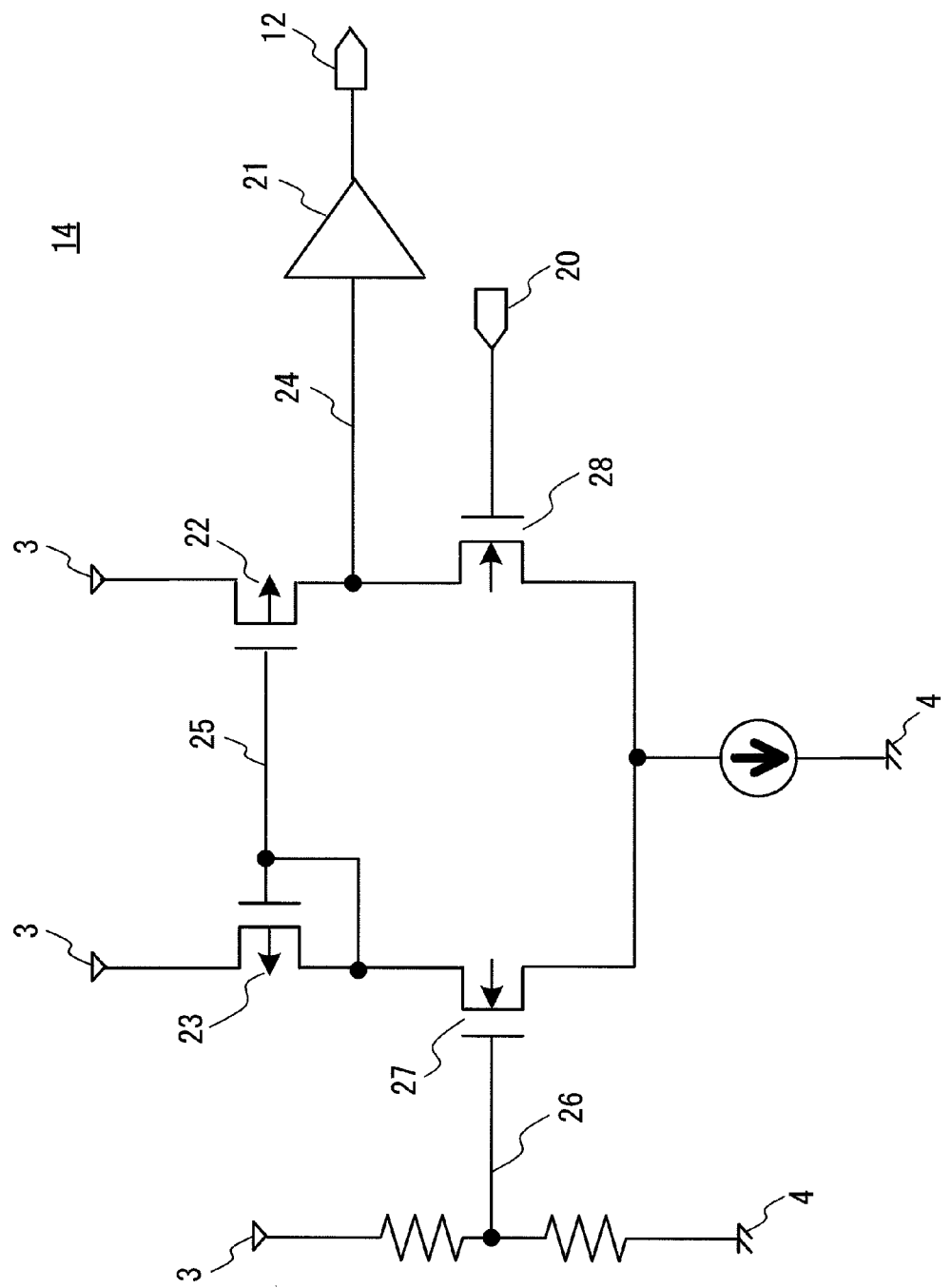
FIG. 2 is a view showing a configuration example of a detection circuit included in the voltage generation circuit according to the first embodiment of the present invention.

FIG. 2 shows a configuration example of the detection circuit 14 included in the voltage generation circuit according to the first embodiment. The detection circuit 14 is composed of two transistors (load stage transistor) that compose an active load circuit, two transistors (differential stage transistor) that composes a differential pair and compares the voltage of the external power supply VDD3 and the reference voltage 20, and a comparator circuit including an amplifier stage circuit 21. The load stage transistor is composed of an output load stage transistor 22 and a load stage current mirror transistor 23. A differential stage transistor is composed of a negative differential input transistor 27 and a positive differential input transistor 28.

Operation of First Embodiment

Figure 3:
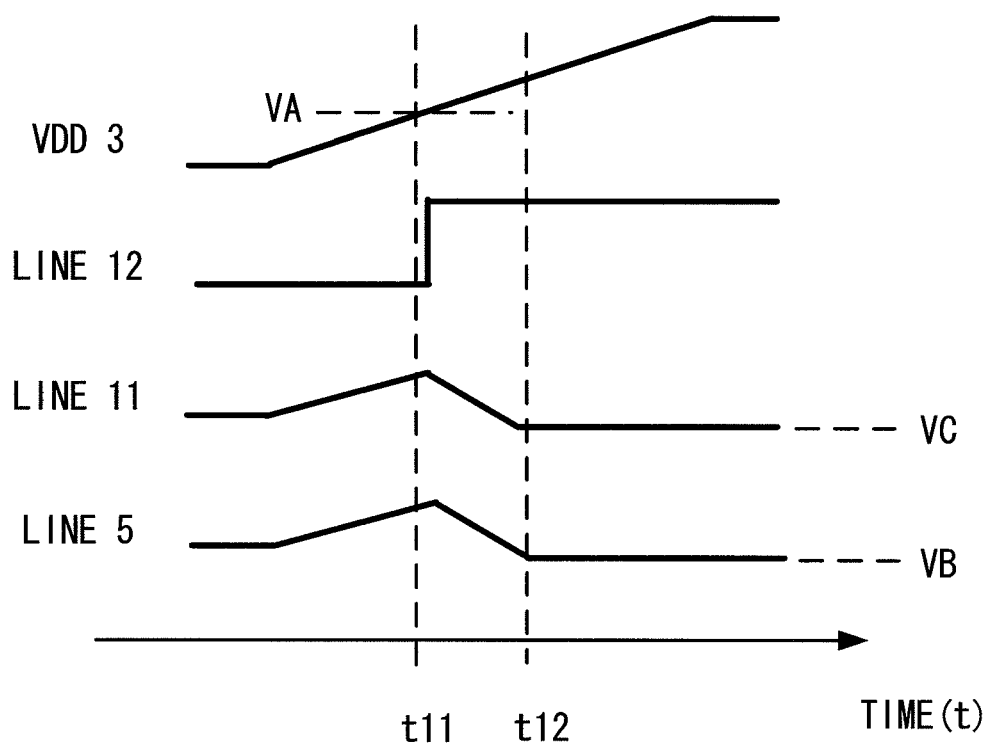
FIG. 3 is a timing chart showing an operation example of the voltage generation circuit according to the first embodiment of the present invention.

FIG. 3 is a timing chart according to a first embodiment of the present invention.

The detection voltage value generated according to the reference voltage 20 shall be "VA" (hereinafter also referred to a "detection voltage value VA of the detection circuit 14" as appropriate).

The voltage value when the output voltage is stabilized that is determined by a feature of the regulator 10 shall be "VB" (hereinafter also referred to as an "output voltage value VB of the regulator 10" as appropriate). The output voltage determined by the feature of the regulator 10 here indicates an output voltage determined by a configuration of the amplifier circuit 17 for amplifying a difference voltage between the reference voltage 6 and the voltage of the line 15 that is in proportion to the voltage of the output voltage line 5, and the drive element 1.

The voltage value of the output line 11 from the amplifier circuit 17 when the regulator 10 outputs the output voltage value VB shall be "VC" (hereinafter also referred to as a "voltage value VC of the output line 11" as appropriate).

The detection voltage value VA of the detection circuit 14 here is assumed to be set higher than the output voltage value VB of the regulator 10 and also less than or equal to the rated value of the internal power supply voltage in the internal circuit 16. In addition, when the voltage level of the external power supply VDD3 is less than or equal to the detection voltage value VA of the detection circuit 14, the detection circuit 14 is assumed to output the L level control signal to the output line 12. When the voltage level of the external power supply VDD3 exceeds the detection voltage value VA of the detection circuit 14, the detection circuit 14 is assumed to output the H level control signal to the output line 12.

FIG. 3 shows the state in which the voltage changes over time (horizontal axis) in the external power supply VDD3 and each line. The timing when the voltage level of the external power supply VDD3 exceeds the detection voltage value VA of the detection circuit 14 shall be "t11".

When the voltage level of the external power supply VDD3 is less than or equal to the detection voltage value VA of the detection circuit 14, the drive elements 1 and 2 are activated by the control of the control circuit 13, and the external power supply VDD3 supplies charges to the internal circuit 16. Specifically, the drive element 2 and the control element 18 are controlled to be in the active state (ON state) by the control signal output to the output line 12 while the voltage level of the external power supply VDD3 is less than or equal to the detection voltage value VA of the detection circuit 14. As the control element 18 is turned on, the drive element 1 is compulsorily controlled to be in the active state regardless of the operation state of the amplifier circuit 17.

Therefore, the voltage of the output line 11 of the amplifier circuit 17 and the output voltage line 5 of the regulator 10 will be the same voltage level as that of the external power supply VDD3 till the timing t11.

When the voltage level of the external power supply VDD3 increases and exceeds the detection voltage value VA of the detection circuit 14 at the timing t11 in FIG. 3, the drive element 2 is deactivated by the control of the control circuit 13. At the same time, the control element 18 is turned off (inactive state). Then, the drive element 1 is controlled by the amplifier circuit 17.

Therefore, the voltage of the output voltage line 5 of the regulator 10 and the output line 11 of the amplifier circuit 17 will be a voltage reduced from the voltage level of the external power supply VDD3. At this time, the voltage is slowly reduced, the output voltage line 5 reaches the output voltage value VB of the regulator 10, and the output line 11 of the amplifier circuit 17 reaches the voltage value VC of the amplifier circuit 17. After that, the output voltage value VB or the voltage value VC is maintained by feedback control.

Mechanism and Advantage of First Embodiment

In FIG. 3, the drive element 2 and the control element 18 are maintained to be in the active state (ON state) by the control signal (L level) from the output line 12 of the detection circuit 14 until the voltage level of the external power supply VDD3 increases to the detection voltage value VA (till the timing t11). Therefore, current is supplied to the output line 11 of the amplifier circuit 17 from the external power supply VDD3 via the control element 18, and the voltage for controlling the gate of the drive element 1 increases. As a result, the drive element 1 and the drive element 2 are activated. In this way, as the current is supplied to the output voltage line 5 of the external power supply VDD3 till the timing t11, the voltage level of the output voltage line 5 follows the external power supply VDD3 and increases.

In addition, when the voltage level of the output voltage line 5 exceeds the output voltage value VB until the voltage level of the external power supply VDD3 increases from a low voltage level state (for example at the time of startup) to the detection voltage value VA (the timing t11), the amplifier circuit 17 attempts to reduce the voltage of the output line 11 by the feedback control. Since the voltage level of the output voltage line 5 continues to increase, the voltage output from the amplifier circuit 17 reaches a GND level. However, since the drain of the control element 18 is connected to the gate of the drive element 1, the drive element 1 is compulsorily controlled to be in the active state. In this way, when the external power supply VDD3 is less than the detection voltage value VA of the detection circuit 14, both the drive elements 1 and 2 are maintained to be in the active state. Even when the voltage of the output voltage line 5 exceeds the level of the output voltage value VB of the regulator 10, the drive element 1 will not switch from the active state to the inactive state, and maintains to be in the active state.

As a result, the output line 11 of the amplifier circuit 17 and the output voltage line 5 of the regulator 10 have the same voltage level as the external power supply VDD3.

Next, when the voltage level of the external power supply VDD3 exceeds the detection voltage value VA at the timing t11, the control signal from the detection circuit 14 rises from L level to H level, and the drive element 2 and the control element 18 change from the active state (ON state) to the inactive state (OFF state). Then, the current supply to the output voltage line 5 of the external power supply VDD3 is stopped via the drive element 2, and thus the voltage of the output voltage line 5 of the regulator 10 attempts to decrease. The current supply to the output line 11 of the external power supply VDD3 is stopped via the control element 18 at the same time, and thus the voltage of the output line 11 also attempts to decrease.

While the voltage of the output line 11 decreases, the drive element 1 is maintained to be in the active state for a certain period. Therefore, while the drive element 1 is maintained to be in the active state, the current is supplied to the output voltage line 5 of the external power supply VDD3 via the drive element 1. This is generated while the control element 18 is tuned off when the control signal of the detection circuit 14 changes from the L level to the H level, there is a period generated in which the voltage for controlling the gate (voltage of the output line 11) maintains the voltage for controlling the drive element 1 to be in the active state. As a result, the current is supplied to the output voltage line 5 of the external power supply VDD3 via the drive element 1, and thereby slowing down the voltage reduction speed of the output voltage line 5. Accordingly, a sharp reduction in the voltage of the output voltage line 5 can be suppressed.

The timing when the voltage of the output line 11 drops to the voltage value VC shall be "t12". After the timing t12, in response to a slow drop in the voltage of the output line 11, the feedback control of the amplifier circuit 17 functions and the voltage output to the output line 11 increases.

As a result, the voltage of the output voltage line 5 is controlled by the output voltage value VB of the regulator 10, the output line 11 is controlled by the voltage value VC of the amplifier circuit 17, and thereby enabling stable voltage supply after the timing t12.

As described above, as the drive element 1 maintains to be in the active state between the timing t11 and timing t12, a sharp voltage fluctuation in the output voltage line 5 can be suppressed. Therefore, as in the related art, a time lag is generated until the drive element 1 is activated, and the fluctuation in the output voltage of the regulator can be avoided.

Further, in this embodiment, as it is not necessary to ease the drop in the output voltage by an external capacitive element, the external capacitive element can be eliminated. Additionally, a terminal for connecting the external capacitive element to the output line of the regulator can be eliminated. This enables reduction in the cost including reduction in the circuit size, time required for manufacture and the like.

Note that in the first embodiment, a case is explained in which the detection voltage value VA of the detection circuit 14 is greater than the output voltage value VB so as to make the feature and advantage of this embodiment prominent. However, it is apparent that the advantage of suppressing the sharp voltage reduction of the output voltage line 5 can be achieved even when the detection voltage value VA is less than the output voltage value VB.

Second Embodiment

Configuration of Second Embodiment

Figure 4:
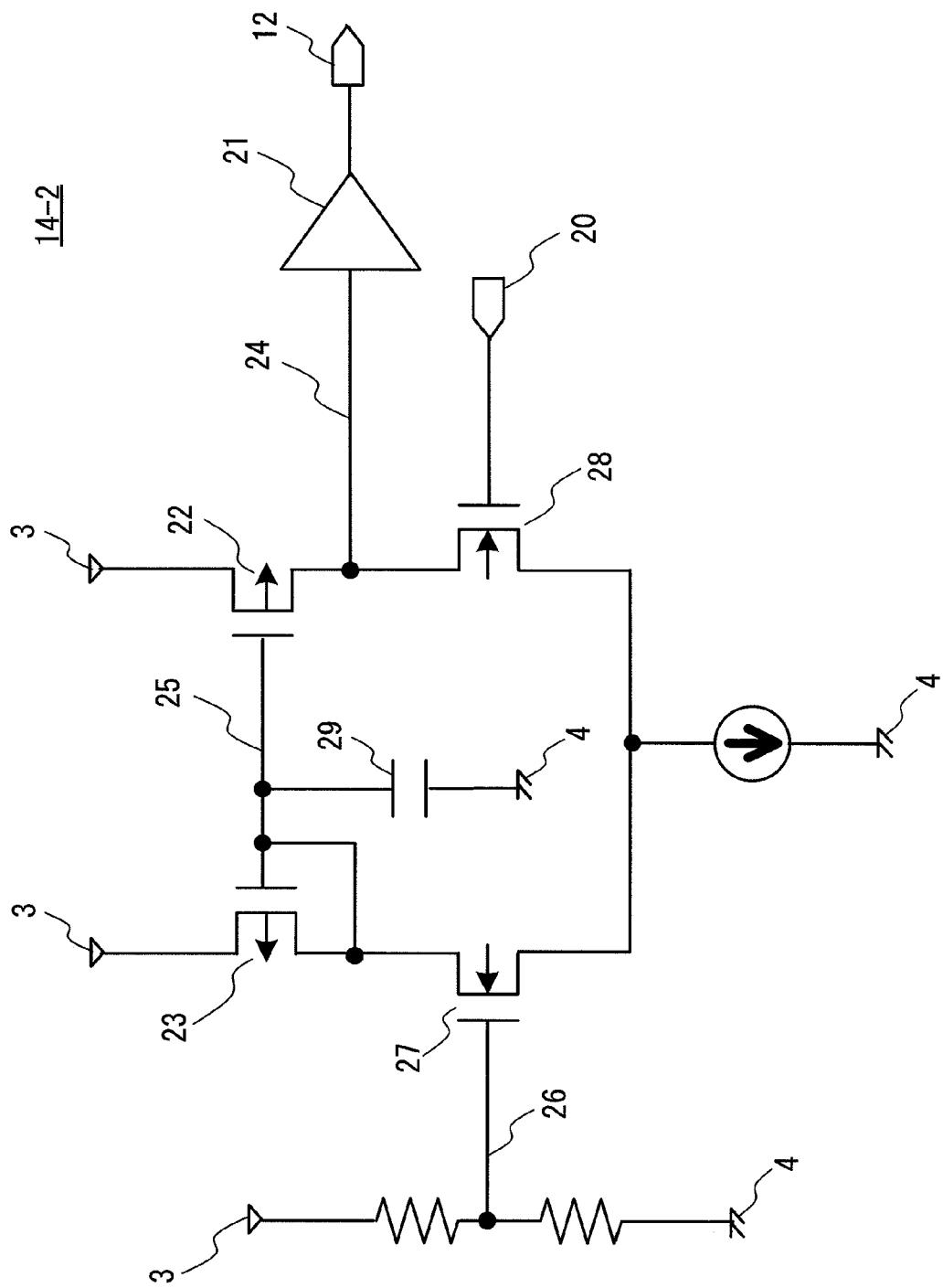
FIG. 4 is a view showing a configuration example of a detection circuit included in the voltage generation circuit according to a second embodiment of the present invention.

FIG. 4 shows a configuration example of a detection circuit 14-2 according to a second embodiment. The detection circuit 14-2 according to the second embodiment further includes a capacitive element 29 between the gate of the output load stage transistor 22 and GND (second power supply, ground) 4 in addition to the configuration of the detection circuit 14 shown in FIG. 2.

Operation of Second Embodiment

Figure 5:
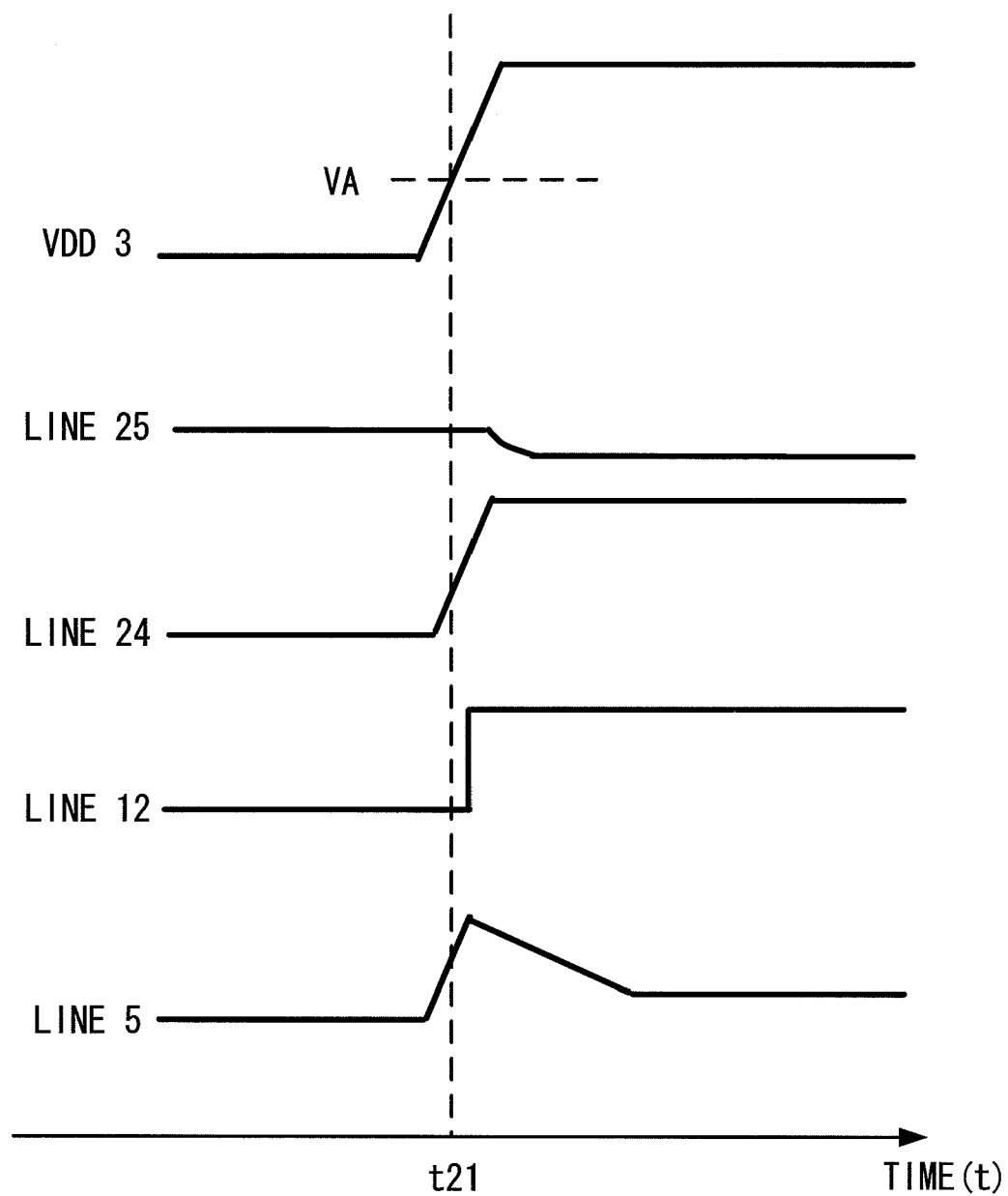
FIG. 5 is a timing chart showing an operation example of the voltage generation circuit according to the second embodiment of the present invention.

FIG. 5 is a timing chart showing an operation example of a voltage power supply circuit according to the second embodiment of the present invention. When the external power supply VDD3 sharply increases, the capacitive element 29 functions and the gate line 25 of the output load stage transistor 22 slowly changes at the timing t21 when the voltage of the external power supply VDD3 exceeds the detection voltage value VA. Thus the voltage in a drain 24 of the output load stage transistor 22 instantly rises to high level, the output line 12 instantly rises to high level via the amplifier stage circuit 21, and the drive element 2 and the control element 18 instantly transition to the inactive state.

Mechanism and Advantage of Second Embodiment

When the external power supply VDD3 sharply increases, as the drive element 2 and the control element 18 instantly transition to the inactive state, the increase in the voltage of the output voltage line 5 can be suppressed.

Third Embodiment

Configuration of Third Embodiment

Figure 6:
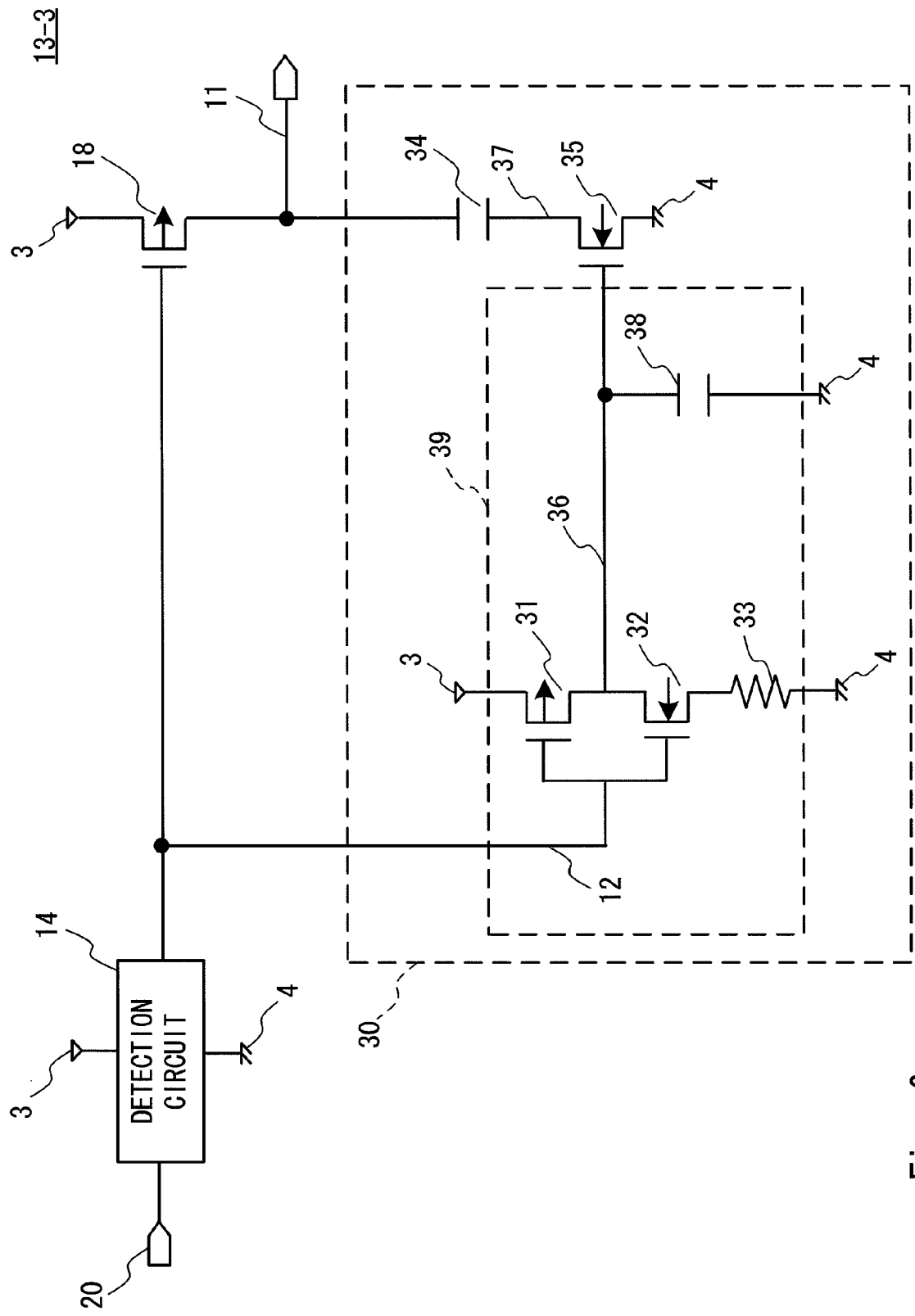
FIG. 6 is a view showing a configuration example of a timing generation circuit included in a control circuit according to a third embodiment of the present invention.

FIG. 6 shows a configuration example of a timing generation circuit included in a control circuit 13-3 according to a third embodiment of the present invention. A timing generation circuit 30 (timing generation unit) is connected between the output line 12 of the detection circuit 14 and the output line 11 of the control element 18. The timing generation circuit 30 includes a capacitive element 34, a control transistor (control element) 35, and a switch circuit (switch unit) 39.

The capacitive element 34 is disposed between the control element 18 and the control transistor 35, and is connected to GND 4 via the control transistor 35.

As for the control transistor 35, one terminal is connected to the GND4, the other terminal is connected to the capacitive element 34, and the gate is connected to an output terminal of the switch circuit 39. Specifically, the control transistor 35 is composed of an N-type transistor, the source is connected to the GND4, the drain is connected to the capacitive element 34 (line 37), and the gate is connected to the output terminal (line 36) of the switch circuit 39.

The switch circuit 39 is disposed between the detection circuit 14 and the control transistor 35, and controls the control transistor 35 according to the control signal (voltage of the output line 12) output from the detection circuit 14. Specifically, when the voltage of the external power supply VDD3 is less than or equal to the detection voltage value VA, the switch circuit 39 controls the control transistor 35 to be in the active state and connects the capacitive element 34 to the GND4. When the voltage of the external power supply VDD3 exceeds the detection voltage value, the switch circuit 39 controls the control transistor 35 to be in the inactive state at a delayed timing and separates the capacitive element 34 from the GND4. Specifically, the switch circuit 39 is composed of a P-type transistor 31, an N-type transistor 32, a resistive element 33, and a capacitive element 38. The drain of the P-type transistor 31 and the drain of the N-type transistor 32 are connected to the line 36 that is connected to the control transistor 35. The source of the P-type transistor 31 is connected to the external power supply VDD3. The source of the N-type transistor 32 is connected to the GND4 via the resistive element 33. The gate of the P-type transistor 31 and the gate of the N-type transistor 32 are connected to the output line 12 of the detection circuit 14.

The capacitive element 38 is disposed between the line 36, which is connected to the gate of the control transistor 25, and the GND4.

Operation of Third Embodiment

Figure 7:
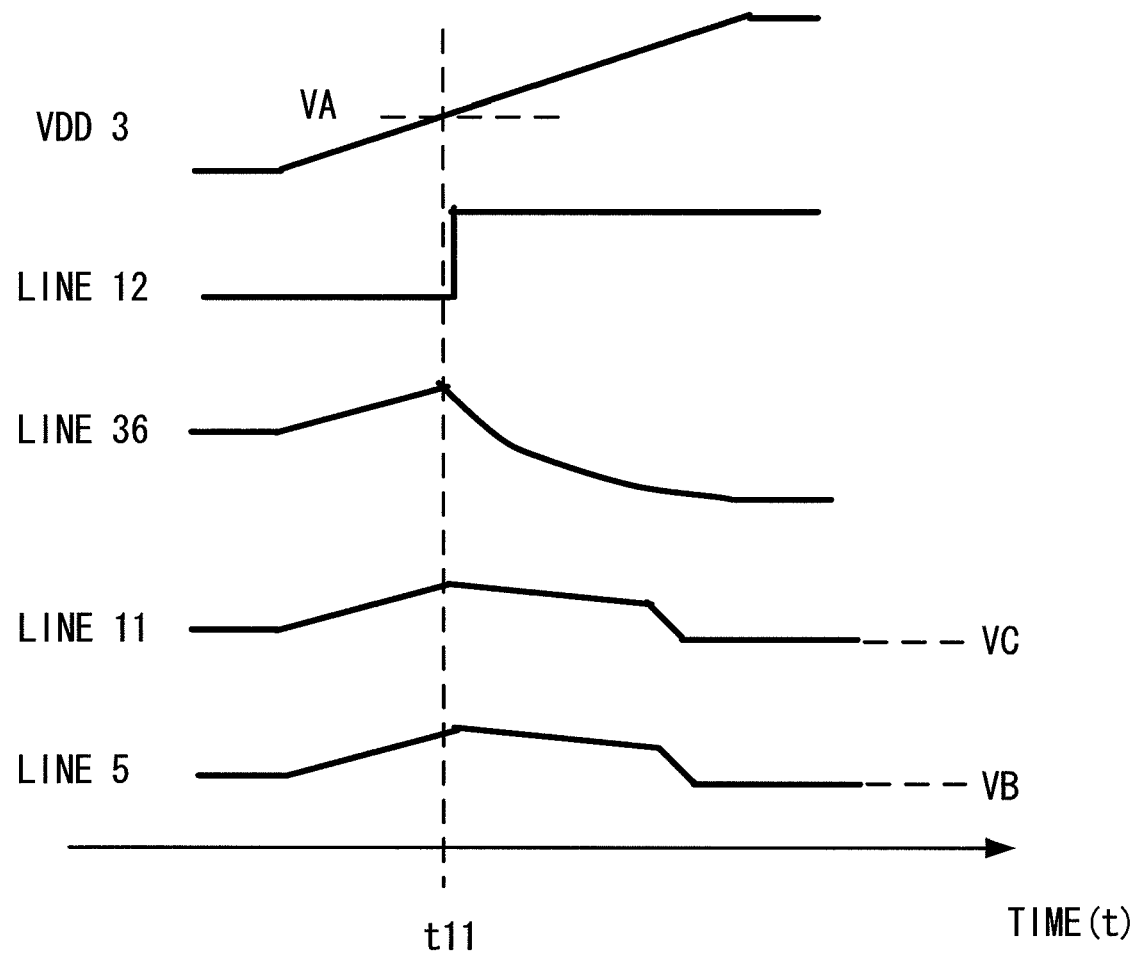
FIG. 7 is a timing chart showing an operation example of a voltage generation circuit according to a third embodiment of the present invention.
Figure 8:
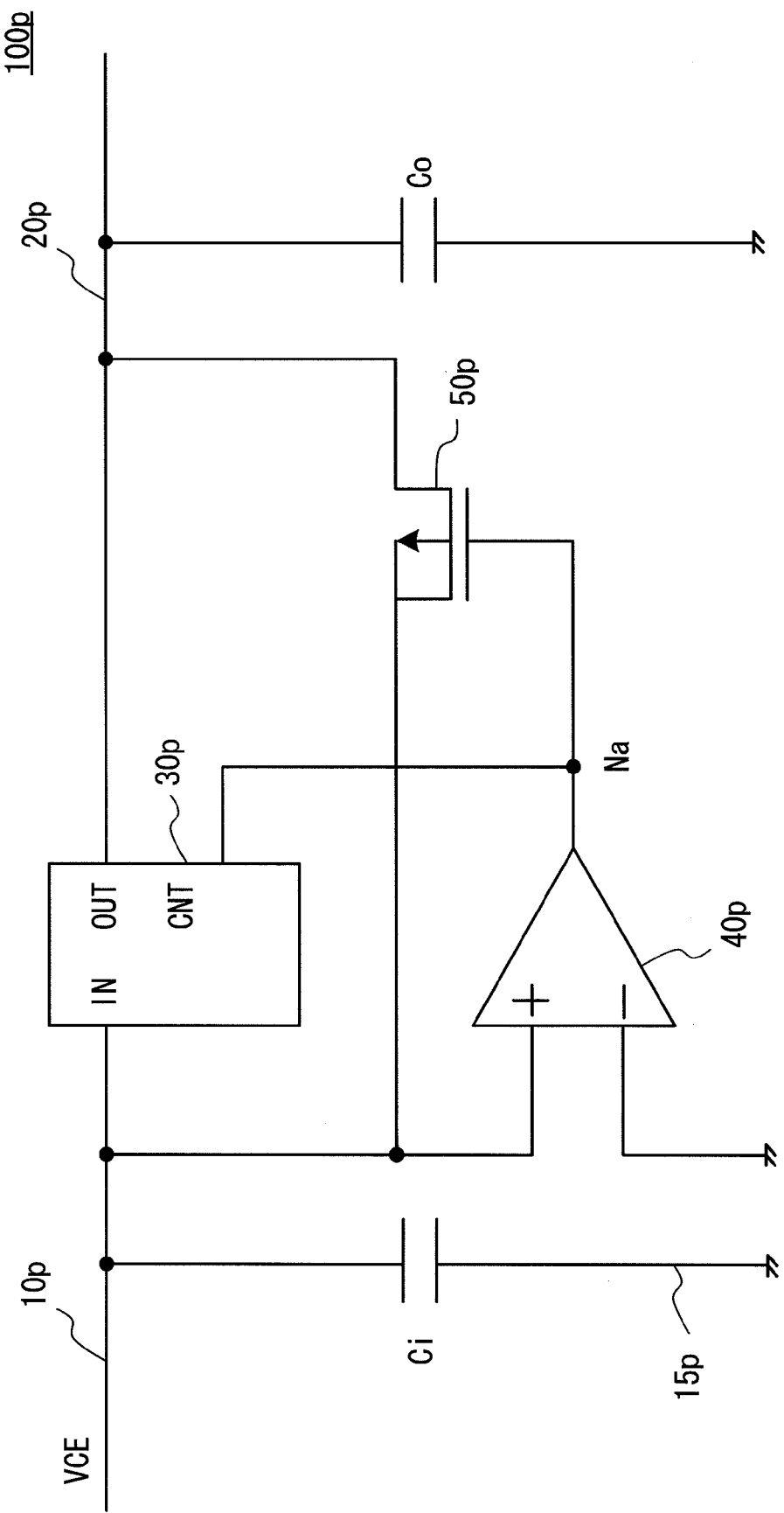
FIG. 8 is a view showing a configuration of a voltage generation circuit disclosed in Japanese Unexamined Patent Application Publication No. 2000-339042.

FIG. 7 is a timing chart showing an operation example of a voltage generation circuit according to a third embodiment of the present invention. When the voltage level of the external power supply VDD3 is less than detection voltage value VA of the detection circuit 14, the output line 12 is in the GND level, the P-type transistor 31 is turned on, and the N-type transistor 32 is turned off. Thus the voltage of the gate line 36 is the voltage level of an external power supply 3. Therefore, the control transistor 35 is controlled to be turned on, the line 37 becomes the GND level, and the capacitive element 34 functions as a delay element. Moreover, since the drive element 2 is in the active state, the output voltage line 5 is in the voltage level of the external power supply 3, and since the control element 18 is turned on, the output line 11 is in the voltage level of the external power supply 3.

As the output line 12 becomes the voltage level of the external power supply 3 at the time when the voltage level of the external power supply VDD3 exceeds the detection voltage value VA of the detection circuit 14, the P-type transistor 31 is turned off, and the N-type transistor 32 is turned on, the voltage of the gate line 36 is reduced. However as the resistive element 33 and the capacitive element 38 cause a delay, the reduction speed of the voltage slowly decreases. When the voltage of the gate line 36 is reduced to a threshold voltage of the control transistor 35, the control transistor 35 is turned off, the line 37 floats, and the capacitive element 34 will not function as the delay element.

Mechanism and Advantage of Third Embodiment

After the external power supply VDD3 exceeds the detection voltage value VA of the detection circuit 14 until the control transistor 35 is turned off, predetermined time is reserved by the resistive element 33 and the capacitive element 38, and the capacitive element 34 functions as the delay element. Therefore, a voltage is supplied to the output line 11 and the voltage level of the output line 11 of the amplifier circuit 17 slowly changes. At this time, as compared to the first embodiment, the active period of the drive element 1 is extended and the output line 11 can be maintained to be in a high voltage level for a longer time. Accordingly, as compared to the first embodiment, more current is supplied to the output voltage line 5 of the external power supply VDD3, and the output voltage line 5 can slowly change.

Note that as the capacitive element 34 will not function as the delay element when the control transistor is turned off, the state in which the control transistor 35 is turned off does not influence the regulator operation.

Other Embodiment

Although each of the above embodiments illustrated the configuration example of the voltage generation circuit, it is not limited to this. For example, the control circuits 13 and 13-3 may be other configurations as long as it is a circuit that is configured to activate the drive element 1 using the voltage for controlling the gate of the drive element 1 or maintain the active state of the drive element 1 at the timing when the drive element 2 is controlled from the active state to the inactive state.

Although FIG. 6 of the third embodiment is explained using the detection circuit 14 of the first embodiment, it may be the case of using the detection circuit 14-2 of the second embodiment.

As described above, each embodiment of the present invention explained the voltage generation circuit of the semiconductor integrated circuit that enables suppression of the fluctuation in the output voltage from the regulator by the fluctuation in the external power supply voltage. The voltage generation circuit includes a function to supply a voltage reduced from the external power supply voltage to the internal circuit via the drive element 1, a function to supply the external power supply voltage to the internal circuit via the drive element 2 when the voltage level of the external power supply voltage is less than the predetermined detection voltage value VA, and a control circuit that controls the first and the second drive element to be in the active state when the voltage level of the external power supply is less than the predetermined detection voltage value VA.

The control circuit includes a detection circuit that detects the voltage that is in proportion to the external power supply voltage, and when the voltage level of the external power supply is less than the predetermined detection voltage value VA, the first and the second drive element is controlled to be in the active state. Then the charge is supplied to the internal circuit from the external power supply. When the voltage level of the external power supply exceeds the predetermined detection voltage value VA, the first drive element is configured to be regulatory controlled by the amplifier circuit while controlling the second drive element to be in the inactive state.

As described above, when the second drive element transitions from the active state to the inactive state, the first drive element is in the active state and there is no time lag until the first drive element is activated from the inactive state. This enables suppression of the drop in the output voltage output from the voltage generation circuit.

While the invention has been described in terms of several embodiments, those skilled in the art will recognize that the invention can be practiced with various modifications within the spirit and scope of the appended claims and the invention is not limited to the examples described above.

Each embodiment can be combined as desirable by one of ordinary skill in the art.

Further, the scope of the claims is not limited by the embodiments described above.

Furthermore, it is noted that, Applicant's intent is to encompass equivalents of all claim elements, even if amended later during prosecution.

What is claimed is:

1. A voltage generation circuit that supplies an internal power supply voltage to an internal circuit via an output terminal, the voltage generation circuit comprising:
   a regulator, including a first drive element disposed between a first power supply and an output terminal, that supplies a voltage, based on a reference voltage, to the output terminal by controlling the first drive element;
   a second drive element, disposed between the first power supply and the output terminal, that supplies a voltage of the first power supply to the output terminal when the second drive element is in an active state; and
   a control unit that controls the first drive element and the second drive element to be in the active state when the voltage of the first power supply is less than or equal to a detection voltage value, and controls the second drive element to be in an inactive state when the voltage of the first power supply exceeds the detection voltage value, the control unit including:
      a detection unit that detects whether or not the voltage of the first power supply is less than or equal to the detection voltage value, the detection unit including a terminal for outputting a detection result connected to a gate of the second drive element; and
      a third drive element, disposed between the first power supply and a gate of the first drive element, and including a gate connected to the terminal for outputting the detection result.

2. The voltage generation circuit according to claim 1, wherein when the voltage of the first power supply is less than or equal to the detection voltage value, the third drive element supplies the voltage of the first power supply to the gate of the first drive element, and when the voltage of the first power supply exceeds the detection voltage value, the third drive element stops supplying the voltage of the first power supply to the gate of the first drive element.

3. The voltage generation circuit according to claim 2, wherein the detection unit further comprises:
   two first transistors that compose an active load circuit;
   two second transistors that compose a differential pair; and
   a capacitive element that is disposed between a gate of the two first transistors that compose the active load circuit and a second power supply.

4. The voltage generation circuit according to claim 2, wherein the control unit further comprises a timing generation unit that is disposed between the detection unit and the third drive element, and slowly changes a voltage for controlling the gate of the first drive element.

5. The voltage generation circuit according to claim 1, wherein the detection unit further comprises:
   two first transistors that compose an active load circuit;
   two second transistors that compose a differential pair; and
   a capacitive element that is disposed between a gate of the two first transistors that compose the active load circuit and a second power supply.

6. The voltage generation circuit according to claim 5, wherein the control unit further comprises a timing generation unit that is disposed between the detection unit and the third drive element, and slowly changes a voltage for controlling the gate of the first drive element.

7. The voltage generation circuit according to claim 1, wherein the detection voltage value is previously set.

8. The voltage generation circuit according to claim 1, wherein the control unit further comprises a timing generation unit that is disposed between the detection unit and the third drive element, and slowly changes a voltage for controlling the gate of the first drive element.

9. The voltage generation circuit according to claim 8, wherein the timing generation unit includes a delay element that delays a drop in the voltage for controlling the gate of the first drive element when the voltage of the first power supply exceeds the detection voltage value.

10. The voltage generation circuit according to claim 9, wherein the timing generation unit further comprises:
    a control element including one terminal that is connected to the second power supply;
    a capacitive element that is connected between the third drive element and the control element, and functions as the delay element; and
    a switch unit that is disposed between the detection unit and the control element, and controls the control element according to the detection result output from the detection unit,
    wherein when the voltage of the first power supply is less than or equal to the detection voltage value, the switch unit controls the control element to be in the active state and connects the capacitive element to the second power supply, and when the voltage of the first power supply exceeds the detection voltage value, the switch unit controls the control element to be in the inactive state at a delayed timing and separates the capacitive element from the second power supply.

11. A voltage generation circuit that supplies an internal power supply voltage to an internal circuit via an output terminal, the voltage generation circuit comprising:
    a regulator, including a first drive element disposed between a first power supply and an output terminal, that supplies a voltage, based on a reference voltage, to the output terminal by controlling the first drive element;
    a second drive element, disposed between the first power supply and the output terminal, that supplies a voltage of the first power supply to the output terminal when the second drive element is in an active state; and
    a control unit that controls the first drive element and the second drive element to be in the active state when the voltage of the first power supply is less than or equal to a detection voltage value, controls the second drive element to be in an inactive state when the voltage of the first power supply exceeds the detection voltage value, controls a voltage for controlling a gate of the first drive element and activates the first drive element, the control unit including:
  a detection unit that detects whether or not the voltage of the first power supply is less than or equal to the detection voltage value, the detection unit including a terminal for outputting a detection result connected to a gate of the second drive element; and
  a third drive element, disposed between the first power supply and a gate of the first drive element, including a gate connected to the terminal for outputting the detection result.

12. The voltage generation circuit according to claim 11, wherein the control unit is configured so that the first drive element maintains to be in the active state at a timing when the second drive element is controlled from the active state to the inactive state.

13. The voltage generation circuit according to claim 11, wherein when the voltage of the first power supply is less than or equal to the detection voltage value, the third drive element supplies the voltage of the first power supply to the gate of the first drive element, and when the voltage of the first power supply exceeds the detection voltage value, the third drive element stops supplying the voltage of the first power supply to the gate of the first drive element.

14. The voltage generation circuit according to claim 11, wherein the detection unit further comprises:
  two first transistors that compose an active load circuit;
  two second transistors that compose a differential pair; and
  a capacitive element that is disposed between a gate of the two first transistors that compose the active load circuit and a second power supply.

15. The voltage generation circuit according to claim 11, wherein the control unit further comprises a timing generation unit that is disposed between the detection unit and the third drive element, and slowly changes the voltage for controlling the gate of the first drive element.

16. The voltage generation circuit according to claim 11, wherein the detection voltage value is previously set.

17. A voltage generation circuit that supplies an internal power supply voltage to an internal circuit via an output terminal, the voltage generation circuit comprising:
  a regulator, including a first drive element disposed between a first power supply and an output terminal, that supplies a voltage, based on a reference voltage, to the output terminal by controlling the first drive element;
  a second drive element, disposed between the first power supply and the output terminal, that supplies a voltage of the first power supply to the output terminal when the second drive element is in an active state; and
  a control unit that controls the first drive element and the second drive element to be in the active state when the voltage of the first power supply is less than or equal to a detection voltage value, and controls the second drive element to be in an inactive state when the voltage of the first power supply exceeds the detection voltage value, the control unit including:
    a detection unit that detects whether or not the voltage of the first power supply is less than or equal to the detection voltage value, the detection unit including a terminal for outputting a detection result connected to a gate of the second drive element; and
    a third drive element, disposed between the first power supply and a gate of the first drive element, including a gate connected to the terminal for outputting the detection result,
  wherein the control unit is configured so that the first drive element maintains to be in the active state at a timing when the second drive element is controlled from the active state to the inactive state.

18. The voltage generation circuit according to claim 17, wherein when the voltage of the first power supply is less than or equal to the detection voltage value, the third drive element supplies the voltage of the first power supply to the gate of the first drive element, and when the voltage of the first power supply exceeds the detection voltage value, the third drive element stops supplying the voltage of the first power supply to the gate of the first drive element.

19. The voltage generation circuit according to claim 17, wherein the detection voltage value is previously set.

* * * * *